United States Patent
van der Knaap et al.

[19]

[11] Patent Number: 6,056,303
[45] Date of Patent: May 2, 2000

[54] MASS SPRING SYSTEM WITH ROLL/PITCH STABILIZATION FOR USE IN VEHICLES

[75] Inventors: Albertus Clemens Maria van der Knaap, Vlaardingen; Hans Bastiaan Pacejka, Rotterdam, both of Netherlands

[73] Assignee: Technische Universiteit Delft, Netherlands

[21] Appl. No.: 08/843,139

[22] Filed: Apr. 25, 1997

Related U.S. Application Data

[62] Division of application No. 08/325,379, filed as application No. PCT/NL93/00094, May 4, 1993, Pat. No. 5,716,067.

[30] Foreign Application Priority Data

May 4, 1992 [NL] Netherlands ............... 9200797

[51] Int. Cl.[7] ............................................. B60G 11/00
[52] U.S. Cl. ............................... 280/124.1; 280/124.106
[58] Field of Search ................ 280/124.106, 124.107, 280/124.1, 726, 675

[56] References Cited

U.S. PATENT DOCUMENTS

| | | |
|---|---|---|
| 3,858,902 | 1/1975 | Howells et al. . |
| 4,278,270 | 7/1981 | Fry ........................... 280/675 |
| 4,515,390 | 5/1985 | Greenberg ................ 280/675 |
| 5,074,582 | 12/1991 | Parsons ..................... 280/721 |
| 5,098,116 | 3/1992 | Edahiro et al. . |
| 5,161,818 | 11/1992 | Kopieczek ................ 280/723 |
| 5,716,067 | 2/1998 | Van Der Knapp et al. .... 280/265 |

FOREIGN PATENT DOCUMENTS

| | | |
|---|---|---|
| 3707085 A1 | 3/1987 | Germany . |
| 37 34 698 | 7/1988 | Germany . |
| 92/01170 | 1/1992 | WIPO . |

*Primary Examiner*—Brian L. Johnson
*Assistant Examiner*—Daniel Yeagley
*Attorney, Agent, or Firm*—Michaelson & Wallace; Peter L. Michaelson

[57] ABSTRACT

A mass spring system for use in a vehicle, in which an unsprung mass is coupled with a support by at least a bearing arm. The mass spring system includes an anti-roll/pitch mechanism including a spring. The spring has a first end coupled with the support and a second end coupled with the bearing arm. The spring defines an axis which can be moved by moving the second end of the spring for exerting on the bearing arm a countermoment corresponding to a load acting on the support. A force component of the spring depends on a distance between the first and second ends of the spring. The second end of the spring can pass through a path, defined on a circle lying on a surface of a sphere, while the first end of the spring lies in a center point of the sphere. The first end of the spring lies outside a plane defined by the circle.

5 Claims, 7 Drawing Sheets

MASS SPRING SYSTEM WITH ROLL/PITCH STABILIZATION FOR USE IN VEHICLES

This application is a division of patent application Ser. No. 08/325,379, now U.S. Pat. No. 5,716,067 filed on Nov. 4, 1994; entitled "Mass Spring System with Roll/Pitch Stabilization for Use in Vehicles", filed as PCT/NL93/00094 on May 4, 1993.

BACKGROUND OF THE INVENTION a. Field of the Invention

The invention relates to a mass spring system for use in a vehicle, in which the sprung mass is connected to a support by means of a bearing arm and a spring leg. The mass spring system is equipped with an anti-roll/pitch mechanism comprising an auxiliary spring, of which one end is connected to the support and the other end to the bearing arm. The axis of the auxiliary spring can be moved by moving one of the two ends of the auxiliary spring, for exerting on the bearing arm a countermoment corresponding to the load acting on the support.

b. Related Art

An example of such a mass spring system is a wheel suspension system such as that known from German Patent document DE-A-3,707,085. Variable reaction forces are exerted on the wheel suspension system during braking or acceleration of a vehicle and when negotiating bends, which leads to rolling or pitching movements of the vehicle. These rolling and pitching movements of the vehicle have an adverse effect on the ride, the steering and the safety of the vehicle. It is therefore desirable to counteract such rolling and pitching movements. The stabilisation system for counteracting said rolling and pitching movements, as known from the above-mentioned German Patent document DE-A-3,707,085, has the drawback that the auxiliary spring is compressed or extended on movement of the axis. Therefore, in the countermoment to be supplied by the auxiliary spring not only the moment arm, but also the force component supplied by the auxiliary spring changes, with the result that the control system for stabilizing the rolling and pitching movements becomes more complex. Movement of the axis of the auxiliary spring in a direction in which the spring is compressed further also requires power, which must supplied in one way or another.

The object of the present invention is to provide an anti-roll/pitch mechanism forming part of the wheel suspension system and requiring a minimum of power, in which the control for supplying the desired countermoment can be simplified.

SUMMARY OF THE INVENTION

This object is achieved according to the present invention by a mass spring system of the above-described type in which the movable end of the auxiliary spring can pass through a circular path, lying on the surface of a sphere, while the fixed end of the auxiliary spring lies in the center point of the sphere. The auxiliary spring can be movable in a flat plane or can pass through the generated surface of a cone.

BRIEF DESCRIPTION OF THE DRAWINGS

Embodiments of the mass spring system according to the present invention are explained in greater detail with reference to the drawing, in which.

DETAILED DESCRIPTION

Figure 1:
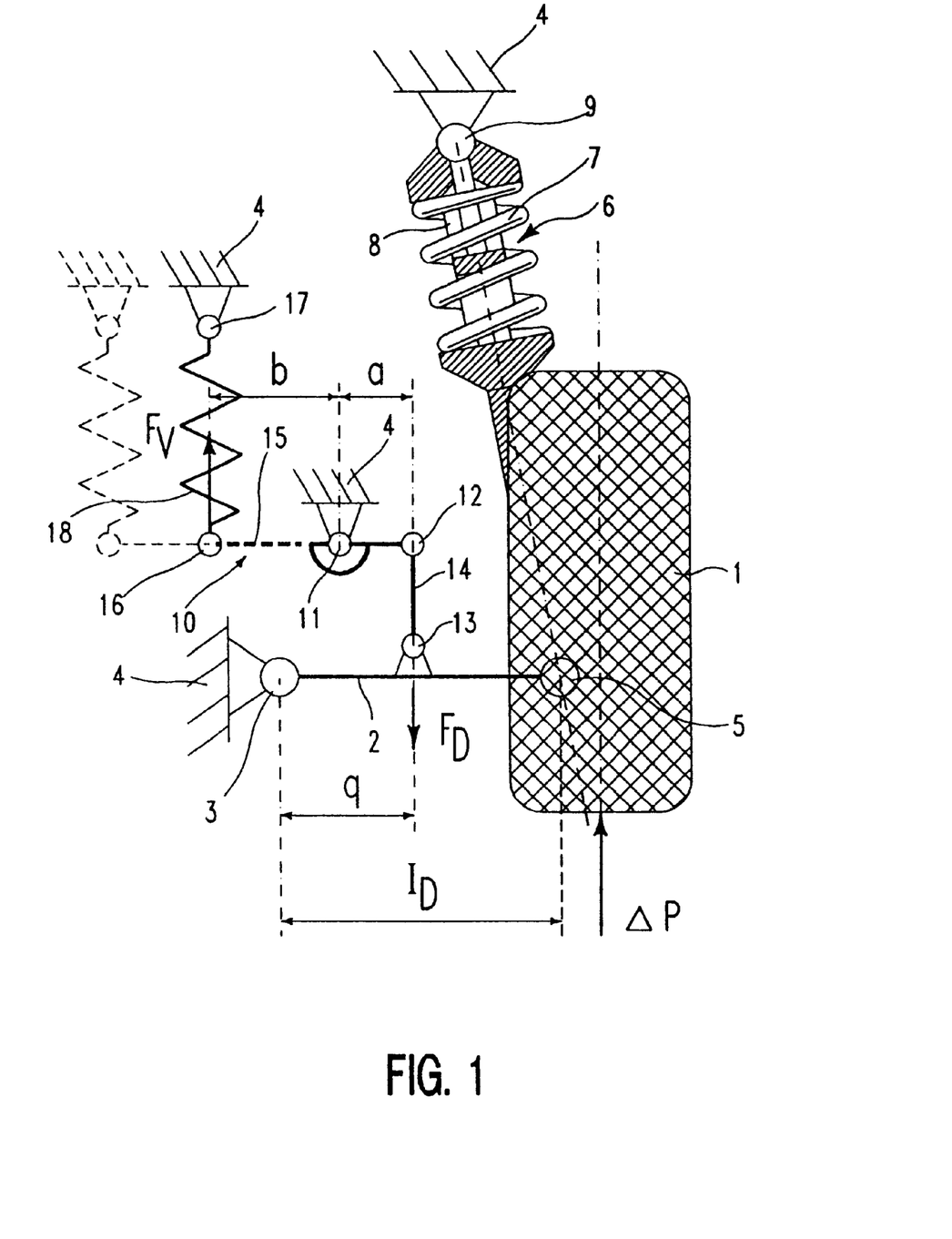
FIG. 1 shows the basic principle of a wheel suspension system according to the present invention.

The basic principle of the present invention is shown in FIG. 1. The wheel 1 is connected to a bearing arm in the form of a linkage triangle 2, of which only one rod is shown. The linkage triangle 2 is hingedly connected at the hinge point 3 to the chassis 4, while the wheel 1 is connected to a hinge point 5 lying in the vertex of the linkage triangle 2. The spring leg 6 acts upon the wheel 1. The spring leg essentially comprises a spring 7 and a shock absorber 8, and is hingedly connected to the chassis 4 at the hinge point 9. The wheel suspension system is of the known MacPherson type.

The anti-roll/pitch mechanism comprises a rod system 10 with a horizontal rod 15 and a pull/push rod 14 which is hingedly connected at 13 to the linkage triangle 2. The pull/push rod 14 is hingedly connected at 12 to the rod 15, which is connected at a hinge point 11 to the chassis 4. An auxiliary spring 18 is fitted on the end 16 of the rod 15, the other end of which spring is hingedly connected at 17 to the chassis 4.

In the absence of the anti-roll/pitch mechanism, the spring 7 of the spring leg 6 is compressed when an increased wheel load Δp occurs, and the linkage triangle 2 will therefore pivot about the hinge point 3. The distance between the axle of the wheel 1 and the hinge point 9 becomes shorter, and this inevitably results in a rolling or pitching movement of the vehicle. This rolling or pitching movement will not occur if a downward directed force $F_D$ is exerted on the linkage triangle 2, in which case:

$$F_D = \frac{l_D}{q} \times \Delta p,$$

in which q=the distance between the line of action of the force $F_D$ and the hinge point 3, and $1_D$ is equal to the height of the linkage triangle 2 or the length of the bearing arm.

The force $F_D$ must therefore be directly proportional to the force Δp exerted on the wheel 1.

The following also applies to the force $F_D$:

$$F_D = \frac{b}{a} \times F_V, \text{ in which}$$

$F_V$ is equal to the pulling force exerted by the spring 18 on the rod 15 of the rod system 10;

b is equal to the distance between the line of action of the spring 18 and the hinge point 11 of the rod 15; and a is equal to the distance between the hinge point 11 of the rod 15 and the line of action of the force $F_D$ or the pull/push rod 14. If the force $F_V$ of spring 18 is held constant and the distance b is varied in proportion to $\Delta P$, it can be ensured that a force $F_D$ is exerted on the linkage triangle 2 which keeps the linkage triangle 2, and therefore the wheel 1, in place. For this purpose, the end points 16, 17 of the spring 18 can be mounted in guides, so that the spring 18 is moved parallel to itself to the extent which is needed for the balance of the linkage triangle 2. Since the movement of the spring 18 is effected at right angles to the direction of the force $F_V$, the movement in principle occurs effortlessly, and only the friction of the guide systems (not shown) need be overcome.

Figure 2:
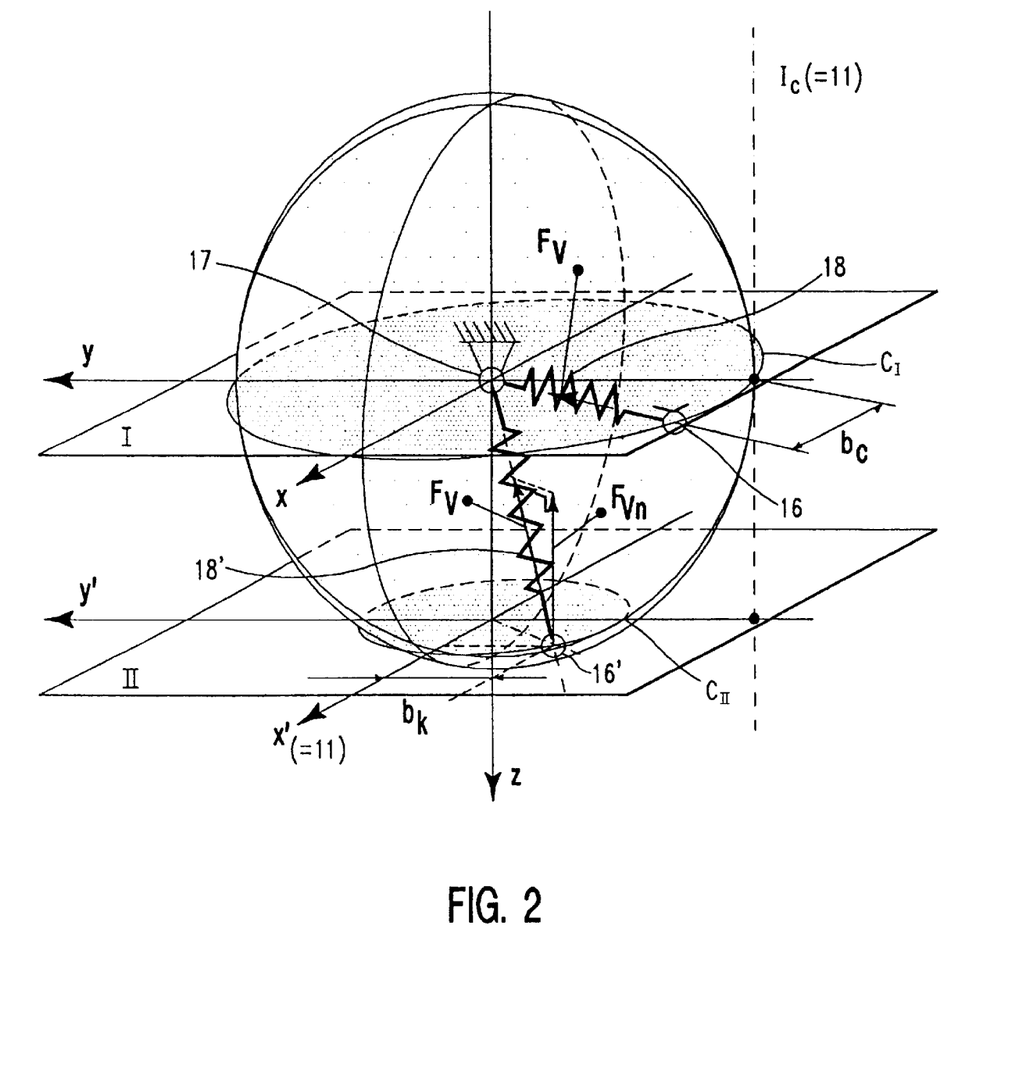
FIG. 2 shows two variants of the wheel suspension system: a circle mechanism and a cone mechanism, in which one end of the auxiliary spring is immovably connected to the chassis of the vehicle.

The provision of two mutually parallel guide systems for the hinge points 16, 17 in a wheel suspension system for a vehicle encounters a number of practical problems. Such systems have the tendency to soil rapidly, with the result that more work is needed for moving the hinge points 16, 17. Besides, the rod 15 of the rod system 10 must be made telescopic. It is therefore desirable to connected the hinge point 17 immovably to the chassis 4 and only to move the hinge point 16 to alter the arm length b in correspondence with the variation of the force $\Delta P$. FIG. 2 diagrammatically shows two possibilities for this.

FIG. 2 shows a sphere having as the center point the hinge point 17 of the spring 18, the radius of the sphere being equal to the length of the spring 18. The plane I, going through the center point 17, intersects the surface of the sphere according to circle $C_I$. By making the hinge point 16 move according to the circle $D_I$, the spring force $F_V$ can produce a variable moment relative to the line $1_c$, which is assumed to coincide with the line through the hinge point 11 of FIG. 1. The moment arm $b_c$ shown in FIG. 2 can vary based on movement of the hinge point 16 along the circumference of the circle $C_I$. In each position the spring 18 lies in the plane I. Such a mechanism can be described as a circle mechanism.

If the spring 18 assumes a different position, such as that indicated by the reference number 18', with the spring length remaining the same, the hinge point 16' can move along a circle $C_{II}$, which is the intersecting circle of the sphere with the plane II. When the circle $C_{II}$ is passed through, the axis of the spring 18' defines a conical face. The vertical component $F_{Va}$ of the spring force $F_V$ produces a variable moment relative to the horizontal axis X', which is assumed to coincide with the hinge point 11 of FIG. 1. In the position shown, the moment arm is equal to $b_k$, the moment arm being dependent on the position of the hinge point 16' on the circle $C_{II}$.

Figure 3:
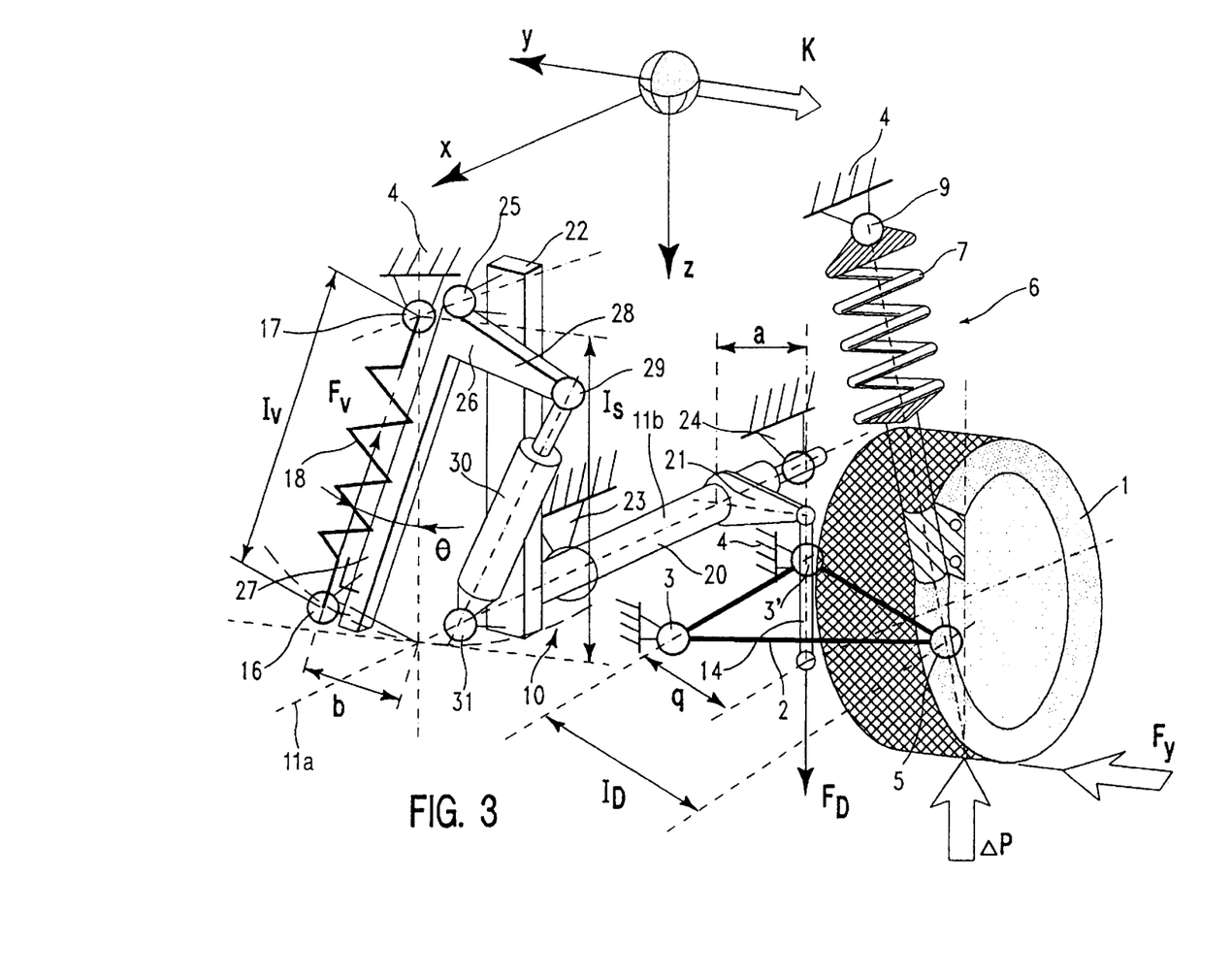
FIG. 3 shows the circle mechanism according to FIG. 2, in a constructionally developed form.

A constructionally developed form of the circle mechanism according to FIG. 2 is shown in FIG. 3. The wheel suspension system corresponds to the wheel suspension system according to the FIG. 1, and corresponding parts are indicated by the same reference numbers.

The rod system 10 for producing the counterforce $F_D$ comprises a first twin-armed lever 20, which is rotatable about a hinge pin 11b mounted coaxial with pin axis 11a and in the chassis 4 parallel to the base points 3, 3' of the linkage triangle 2. The first arm 21 of the lever 20 is hingedly connected to the end of the push/pull rod 14. The other end of the push/pull rod 14 acts upon the linkage triangle 2. The pin 11 is supported hinge pin 11b is supported on pin axis 11a in two fixed supporting points 23, 24 of the chassis 4. The second arm 22 of the first lever 20 is approximately equal to the length of the auxiliary spring 18 and runs parallel to the plane in which the spring 18 can move. Fitted on the end of said second arm 22, at the hinge point 25, is a second lever 26, the first arm 27 of which runs parallel to the auxiliary spring 18, and which is provided at the free end with the attachment point 16 for the auxiliary spring 18. The second arm 28 of the second lever 26 is situated at an angle with the first arm 27 of said second lever 26. At the end 29 of said second arm 28 provision is made for an adjusting element 30, e.g. a hydraulic cylinder. The other end of the adjusting element is hingedly fixed on the hinge pin 11b of the first lever 20 via hinge 31.

It can be seen clearly from FIG. 3 that the force $F_V$ supplied by the spring 18 produces a moment $F_V \times b$ about the hinge pin 11b, where $$b = 1_B \times \sin \theta$$

in which $1_B$ is equal to the length of the lever arm 27 and $\theta$ is the angle which the axis of the spring 18 forms with the connecting line between the fixed point 17 and pin axes 11a of the hinge pin 11b. By now operating the adjusting element 30, the arm length b can be varied, such that the force $F_D$ acting upon the linkage triangle is just sufficient to hold the linkage triangle 2 in place when a force $\Delta P$ exerted on the wheel 1 occurs.

It will be clear that the adjusting element 30 must be driven such that the spring 18 is moved over the desired distance to produce a counterforce $F_D$ which is correctly related to the magnitude of the force $\Delta P$. For this, accelerometers have to be present in the vehicle for measuring the transverse or the longitudinal acceleration. The relationship between measured acceleration and force $\Delta P$ exerted on a particular wheel 1 is known, and therefore so is the desired magnitude of the moment arm b. Such a control system for the adjusting element 30 is known per se and constitutes no part of the present invention, so that a description thereof can be omitted. An electrically driven adjusting element can also be used in the circle mechanism, instead of a hydraulic adjusting element 30.

Figure 4:
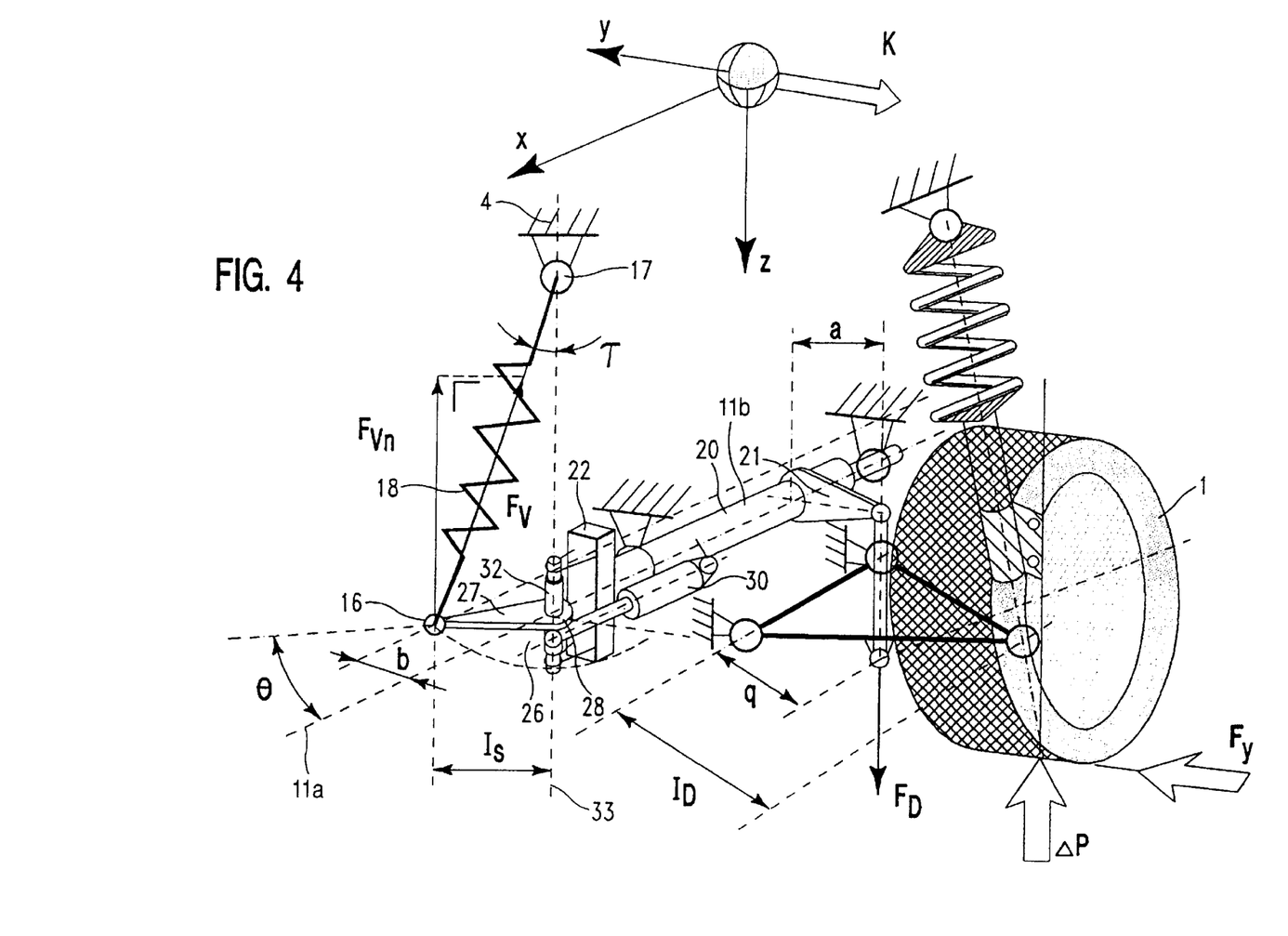
FIG. 4 shows a first embodiment of the cone mechanism.

The cone mechanism shown diagrammatically in FIG. 2 is developed further in FIG. 4. The cone mechanism, like the circle mechanism shown in FIG. 3, comprises a first twin-armed lever 20 with a first arm 21 and a second arm 22. The second arm 22 of the twin-armed lever 20 is designed so that it is shorter than the circle mechanism shown in FIG. 3 and does not extend as far as the fixed attachment point 17 of the auxiliary spring 18. The second arm 22 has fitted thereon a pin 32. The extension of the pin 32 intersects the fixed attachment point 17 of the auxiliary spring 18. A second lever 26, which can be swung about the pin 32, is provided on the pin 32. The first arm 27 of the second lever 26 is connected to the movable hinge point 16 of the auxiliary spring 18, while the second arm 28 of the second lever 26 is connected to the adjusting element 30, which here again is shown as a controllable hydraulic cylinder. On adjustment of the adjusting element 30, the hinge point 16 of the auxiliary spring 18 passes through a circle with a radius equal to the length of the arm 27, while the auxiliary spring 18 passes through a generated surface of a cone with an axis 33 which coincides with the axis of the pin 32. In the position shown, in which the lever arm 27 forms an angle $\theta$ with pin axis 11a the hinge pin 11b, the vertical component $F_{Va}$ of the spring force $F_V$ supplies a moment about the hinge pin 11b which is equal to $F_{Va} \cdot b$. By increasing or reducing the moment arm b, the moment can be brought into correspondence again with the countermoment $F_D \cdot q$ to be supplied by the pull/push rod 14, as already described above.

Figure 5:
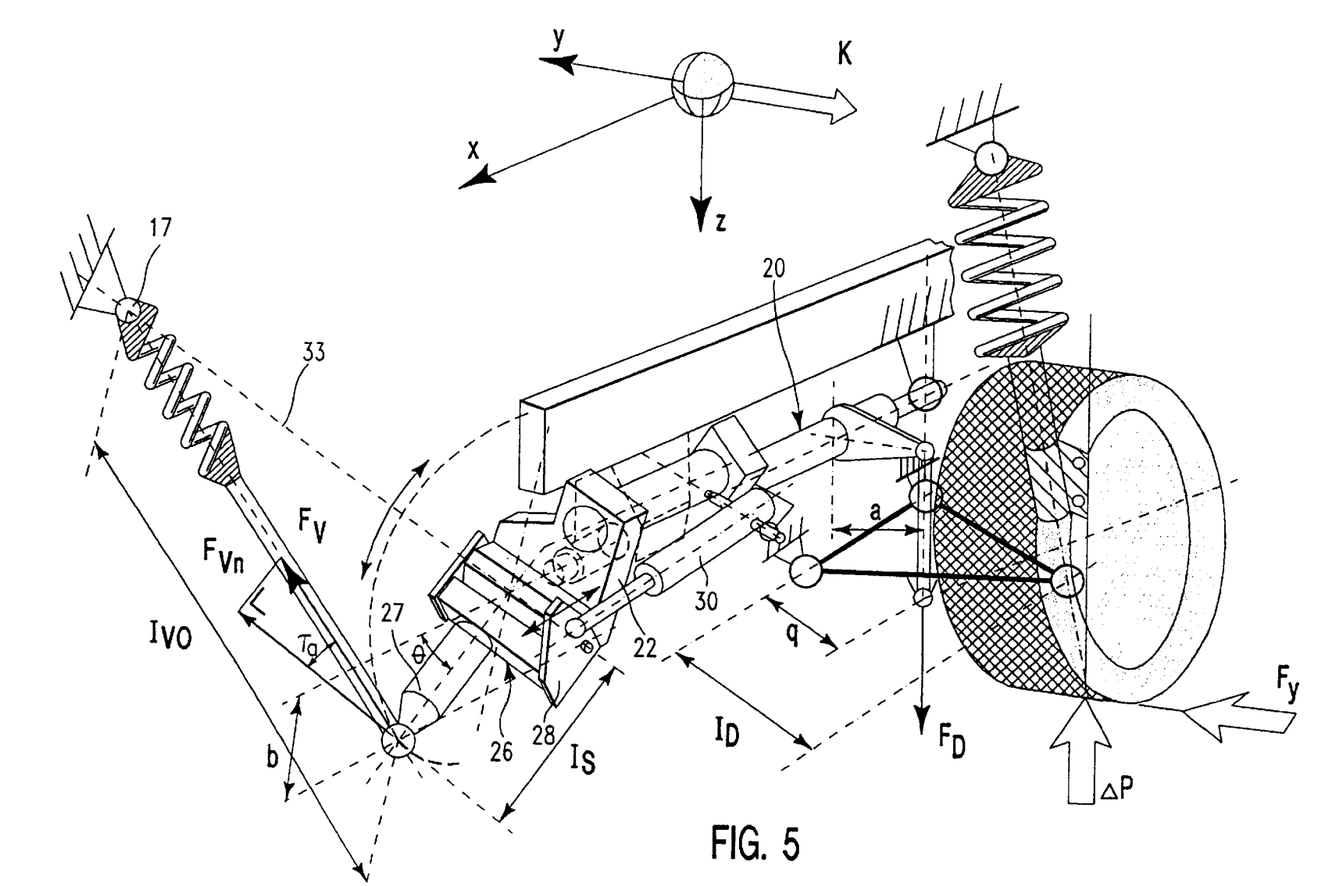
FIG. 5 shows a second embodiment of the cone mechanism.

The cone mechanism shown in FIG. 5 is essentially identical to the mechanism shown in FIG. 4. Only the position of the fixed hinge point 17 of the auxiliary spring 18 is changed compared to FIG. 4, to indicate that the position of this point can be freely selected, of course on condition that when the hinge point 17 of the auxiliary spring 18 is moved, the direction of the pin 32 (see FIG. 4) must also be changed, because the pin 32 must lie in the axis of the cone which is passed through by the auxiliary spring 18 when the adjusting element 30 is driven. The first twin-armed lever 20 has acquired a more complex form in FIG. 5 than in FIG. 4, because this is a mechanism produced in practice, in which the central pin of the first lever 20 had to be made stepped to be able to guide the central pin along other parts of the vehicle.

Figure 6:
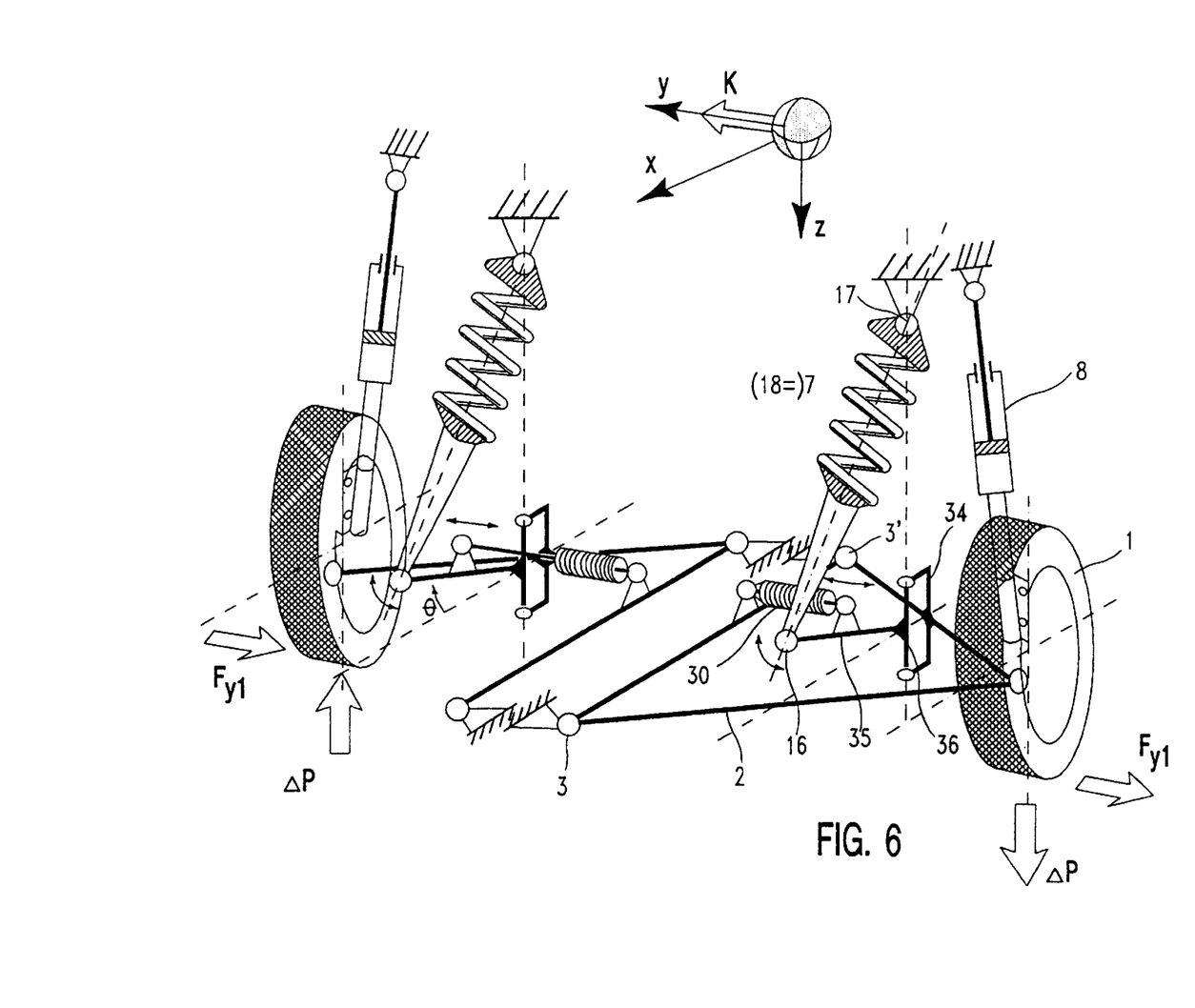
FIG. 6 shows a variant of the wheel suspension system according to the invention, in which the spring of the spring leg also fulfils the function of auxiliary spring.

FIG. 6 shows a special variant of the cone mechanism according to the invention. The combination of spring 7/shock absorber 8 of the usual spring leg 6 shown in FIG. 1 is divided into a separate shock absorber leg and a spring leg, the spring 7 of which also acts as an auxiliary spring 18. The lower end 16 of the spring 7 is connected to a T-shaped rod 35, of which the transverse leg 36 is accommodated in a fork 34 which is connected to a rod of the bearing arm or linkage triangle 2. The transverse leg 36 of the T-shaped rod 35 lies in the axis of the cone, which axis also passes through the fixed point 17 of the spring 7. The spring 7 therefore also in this case passes through the generated surface of a cone, the base of which circle has a radius which is equal to the length of the T-shaped rod 35. The adjusting cylinder 30 is hingedly connected by its one end to the T-shaped rod 35, while the other end is connected to the bearing arm 2. While the vehicle is being driven straight ahead, without acceleration or braking, the rod 35 will lie parallel to the hinge line 3–3' of the bearing arm 2. When the wheel is subjected to an additional load or is relieved, the rod 35 will have to move towards or away from the wheel under the influence of the adjusting element 30, to generate an auxiliary force, which can compensate for the additional load or load relief of the wheel 1.

For adjusting the adjusting elements, energy will have to be supplied by the engine of the vehicle, e.g. for driving a hydraulic pump. It is therefore important that the anti-roll/pitch mechanism should require little adjusting energy. It has been found that with the use of four adjusting cylinders, one for each wheel, the power consumption is no higher than 1.2 kW, which still lies below the level of the energy consumption of a hydraulic power steering, which requires approximately 1.5 kW.

The anti-roll/pitch mechanism, as described above, offers a large number of advantages:

the comfort of a vehicle equipped with the anti-roll/pitch mechanism according to the invention is considerably increased, with a very low power consumption;

the anti-roll/pitch mechanism also allows the level of the vehicle to be adjusted;

roll stabilizers may be dispensed with, which improves the ride;

the main suspension of the wheel suspension can be made soft, so that the optimum wheel suspension system as regards ride can be achieved;

with the cone mechanism, virtually all mass is concentrated about the hinge pin of the mechanism, with the result that the mass inertia moment with respect to the hinge pin can be kept very low. The unsprung mass of the wheel suspension will therefore hardly increase through use of the anti-roll/pitch mechanism.

Figure 7:
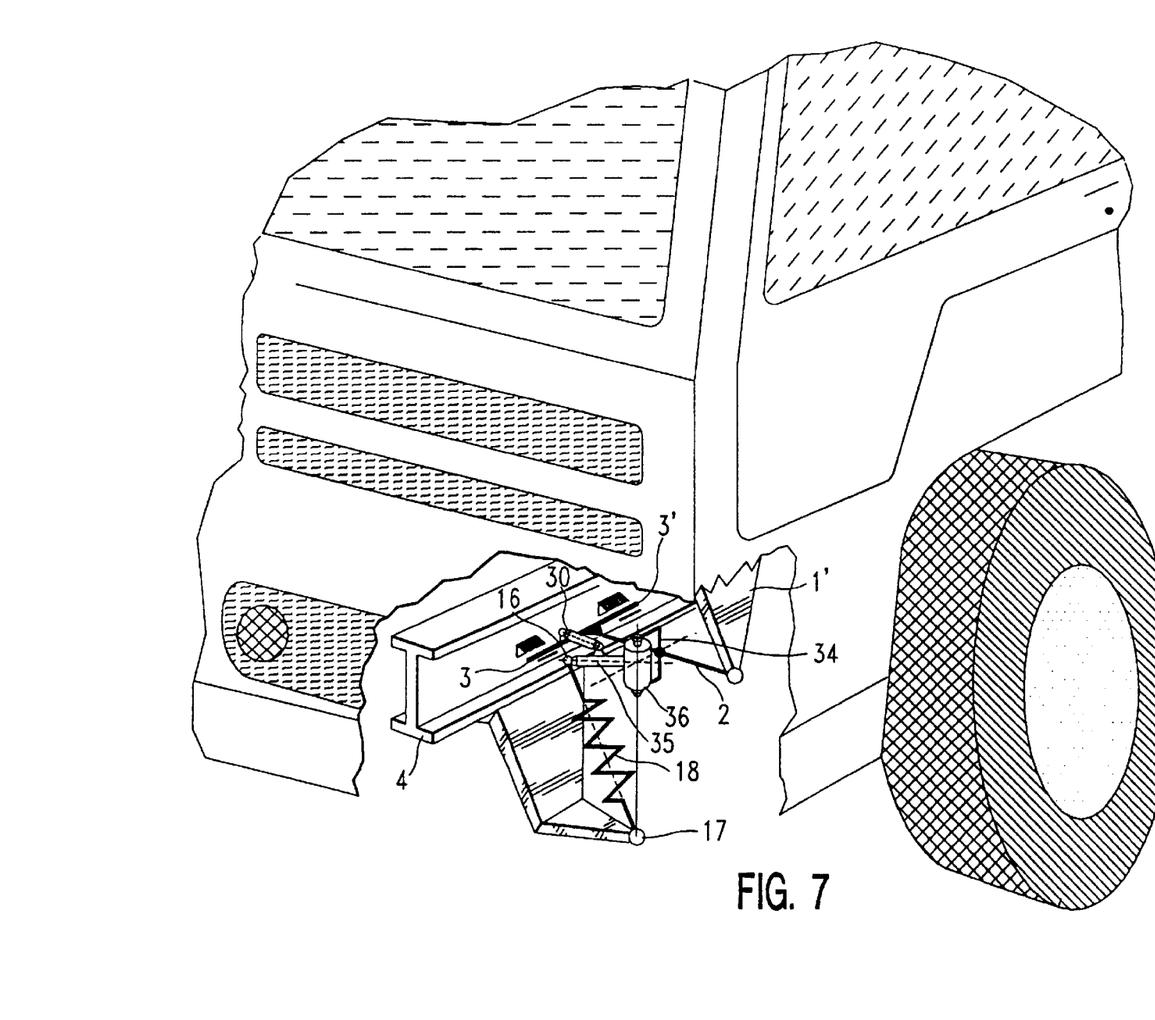
FIG. 7 shows the mass spring system according to FIG. 6 used on a vehicle cab.

FIG. 7 shows the mass spring system according to the invention used for fixing a vehicle cab to a vehicle chassis in a sprung manner. The mass spring system is identical to the spring system according to FIG. 5. A bearing arm 2, which at 3, 3' is hingedly connected to the chassis beam 4, is present between the cab 1' and the vehicle chassis 4. The bearing arm 2 is provided with a fork 34, in which the transverse leg 36 of a T-shaped rod 35 is accommodated. The transverse leg 36 lies in the axis of a cone, which axis also passes through the fixed point 17 of the spring 18. The spring 18 passes through the generated surface of a cone, the base circle of which has a radius which is equal to the length of the T-shaped rod 35. Adjustment of the (auxiliary) spring 18 is carried out by means of the adjusting cylinder 30.

We claim:

1. A mass spring system for use in a vehicle, in which an unsprung mass is coupled with a support by means of at least a bearing arm, the mass spring system comprising an anti-roll/pitch mechanism including a spring having a first end coupled with the support and a second end coupled with the bearing arm, the spring defining an axis which can be moved by moving the second end of the spring laterally with respect to said axis to adjust the magnitude of a countermoment exerted on the bearing arm, such that said countermoment corresponds to a load acting on the support, wherein a force component of the spring depends on a distance between the first and second ends of the spring, and wherein the second end of the spring can pass laterally with respect to said axis through a path, defined on a circle lying on a surface of a sphere, while the first end of the spring lies in a center point of the sphere.

2. Mass spring system according to claim 1, wherein the first end of the spring lies in a plane of the circle, which is passed through by the second end of the spring.

3. A mass spring system for use in a vehicle, in which an unsprung mass is coupled with a support by means of at least a bearing arm, the mass spring system comprising an anti-roll/pitch mechanism including a spring having a first end coupled with the support and a second having a first end coupled with the support and a second end coupled with the bearing arm, the spring defining an axis which can be moved by moving the second end of the spring for exerting on the bearing arm a countermoment corresponding to a load acting on the support, wherein a force component of the spring depends on a distance between the first and second ends of the spring, wherein the second end of the spring can pass through a path, defined on a circle lying on a surface of a sphere, while the first end of the spring lies in a center point of the sphere, wherein the first end of the spring lies in a plane of the circle, which is passed through by the second end, wherein the unsprung mass is further connected to the support by means of a spring leg, wherein the second end of the spring is connected to the bearing arm by means of a rod system wherein the spring acts as an auxiliary spring to the spring leg, wherein the rod system comprises a first twin-armed lever, that mounts for rotation about a hinge pin fixed to the support parallel to base points of the bearing arm, wherein a first arm of the first twin-armed lever is connected to a push/pull rod acting upon the bearing arm, while a second arm of the first twin-armed lever extends in the direction of and up to an axis perpendicular to the spring that passes through the first end of the spring, and hinged on an end of the second arm of the first twin-armed lever is a second twin-armed lever having a first arm extending parallel to the spring and connected by a free end to the second end of the spring, while a first end of an adjusting element acts upon a free end of a second arm of the second twin-armed lever, and wherein a second end of the adjusting element lies on an axis of the hinge pin of the first twin-armed lever.

4. A mass spring system for use in a vehicle, in which an unsprung mass is coupled with a support by means of at least a bearing arm, the mass spring system comprising an anti-roll/pitch mechanism including a spring having a first end coupled with the support and a second end coupled with the bearing arm, the spring defining an axis which can be moved by moving the second end of the spring for exerting on the bearing arm a countermoment corresponding to a load acting on the support, wherein a force component of the spring depends on a distance between the first and second ends of the spring, wherein the second end of the spring can pass through a path, defined on a circle lying on a surface of a sphere, while the first end of the spring lies in a center point of the sphere, wherein the first end of the spring lies in a plane of the circle, which is passed through by the second end, wherein the unsprung mass is further connected to the support by means of a spring leg, wherein the second end of the spring is connected to the bearing arm by means of a rod system wherein the spring acts as an auxiliary spring to the spring leg, wherein the rod system comprises a first twin-armed lever that mounts for rotation about a hinge pin fixed to the support parallel to base points of the bearing arm, wherein a first arm of the first twin-armed lever is connected to a push/pull rod acting upon the bearing arm, while a second arm of the first twin-armed lever extends in the direction of the first end of the spring, and a second twin-armed lever is hingedly fixed on the second arm of the first twin-armed lever, such that an axis of the hinge pin passes through the second end of the spring, wherein a first arm of the second twin-armed lever is connected to the second end of the spring, wherein a first end of an adjusting element acts upon a free end of the second arm of the second twin-armed lever, and wherein a second end of the adjusting element is fixed to the first twin-armed lever.

5. A mass spring system according to claim 4, wherein the first end of the spring lies in a plane of the circle, which is passed through by the second end of the spring.

\* \* \* \* \*